United States Patent Office 3,078,264
Patented Feb. 19, 1963

3,078,264
POLYMERIZATION OF ETHYLENE AND
CATALYST THEREFOR
Carl N. Zellner, Berkeley Heights, N.J., assignor to Celanese Corporation of America, New York, N.Y., a corporation of Delaware
No Drawing. Filed Jan. 30, 1956, Ser. No. 561,986
19 Claims. (Cl. 260—94.9)

This invention relates to the polymerization of ethylene and relates more particularly to catalysts especially adapted for use in the polymerization of ethylene.

The polymerization of ethylene in the presence of metal alkyls has been proposed previously. The metal alkyls are, however, spontaneously inflammable in air and extremely sensitive to moisture so that they are dangerous and difficult to handle. Moreover, they tend to form inactive complexes with ethers and, for this reason, ethers are generally excluded from reaction mixtures in which metal alkyls are used as polymerization catalysts.

It is an object of this invention to provide a process for the polymerization of ethylene which will be free from the foregoing and other defects.

Another object of this invention is the provision of a novel catalyst system for the polymerization of ethylene.

Still another object of this invention is to provide a relatively simple and non-hazardous, but effective, polymerization catalyst.

A further object is the provision of a new method for the production of crystalline polyethylene of unusually high melting point.

Another object is to accomplish the polymerization of ethylene at relatively low pressures and temperatures to yield products with special properties.

Other objects of this invention will be apparent from the following detailed description and claims. In this description and claims all proportions are by weight unless otherwise indicated.

In accordance with one aspect of this invention ethylene is polymerized in a catalyst system formed by mixing several components: (a) a metal hydride, such as sodium hydride or, preferably, lithium aluminum hydride; (b) an aluminum trihalide such as aluminum chloride, aluminum bromide, aluminum fluoride or aluminum iodide; and (c) a halide of a metal of group IVb, such as a chloride, bromide, fluoride or iodide of titanium, zirconium, hafnium or thorium.

The polymerization reaction using the catalyst system of this invention is preferably carried out in the presence of an inert solvent for ethylene, such as an aromatic, aliphatic or cycloaliphatic hydrocarbon. Examples of suitable solvents are benzene, toluene, xylene, cyclohexane, decahydronaphthalene and dodecane. Ethers may be present in the solvent medium without deleterious effect. When a solvent is employed it is advantageous to pass a stream of ethylene gas continuously through a dispersion of the catalyst in the solvent and to agitate the reaction mixture vigorously so as to promote adsorption of the ethylene on the catalyst surface. Unreacted ethylene which escapes from the reaction mixture may be recovered and returned thereto. After a suitable period of reaction, e.g. 2 hours, the desired polymer, which is present in the insoluble solid phase in the reaction mixture, may be separated from the liquid.

The effectiveness of the catalyst may be increased by coating or adsorbing the catalyst onto a relatively inert solid carrier. For example, an ether solution of lithium aluminum hydride may be added to a stirred suspension of powdered solid, such as crushed cryolite, in xylene, decahydronaphthalene, or other inert solvent so as to precipitate said hydride on said solid, and aluminum chloride and titanium tetrachloride may thereafter be added to the resulting mixture. Other solid carriers are natural clays, silica-alumina cracking catalysts, charcoal, etc.

The proportions of the three components of the catalyst system may be varied widely. Excellent results have been obtained when the molar ratios of $AlCl_3 : TiCl_4 : LiAlH_4$ range from 0.1:0.1:1.0 to 1:1:1; i.e. a range of from about $\frac{1}{10}$ to 1 mole of either or both metal halides to 1 mole of metal hydride. Changes in the proportions of the catalyst components cause some variation in the melting points of the polyethylene produced. Thus, by increasing, in the catalyst system, the ratio of the amount of the aluminum halide or the group IVb metal halide to the amount of metal hydride the melting range of the resulting polymer may be lowered.

By the use of the catalyst systems of this invention the polymerization of ethylene may be carried out at low pressures, e.g. at pressures ranging from subatmospheric pressures to low superatmospheric pressures of several atmospheres, for example, a pressure of 50 to 100 atmospheres. However, for reasons of convenience and economy it is preferred to use atmospheric pressure. The temperature of reaction may be varied over a wide range; for example, from room temperature or below to about 200° C. Reaction temperatures of 50 to 150° C. yield the best results.

The polyethylene produced in accordance with this invention are highly crystalline materials whose melting points are generally in the range of about 125 to 170° C. The melting point, in this case, is determined by placing a sample of the polyethylene on a melting point block and observing the temperature at which the sample begins to become clear and lose its crystallinity. Many of these polyethylenes do not become fluid melts until they are heated to temperatures of 200° C. or above. Their physical properties differ markedly from those of conventional polyethylenes produced by polymerization of ethylene under high pressures in the presence of free-radical-producing catalysts. For example, they are harder and stronger than the conventional polyethylenes.

The following examples are given to illustrate this invention further.

*Example 1*

3.8 parts of pulverized lithium aluminum hydride ($LiAlH_4$) are added to 435 parts of dry xylene in a reaction vessel and under an atmosphere of nitrogen. 4.4 parts of aluminum chloride and 4.7 parts of titanium tetrachloride are then added with stirring and ethylene gas at atmospheric pressure is passed into the stirred mixture for 2 hours at a rate of about 35 parts per hour. While the temperature of the reaction mixture is maintained at 75 to 81° C. At the end of the 2 hour period the reaction mixture comprises a suspension of a dark-colored solid. This solid is filtered off and added portionwise to an excess of methanol while cooling to a temperature of 20 to 30° C. so that a partly purified solid polymer is obtained. This polymer is separated from the methanol and then washed thoroughly three times with a mixture of 50% of methanol and 50% of aqueous concentrated hydrochloric acid (of 37% strength) to remove metallic contaminants.

The resulting white fluffy polymer is highly crystalline and is insoluble at room temperature in benzene, toluene, xylene, cyclohexane, decahydronaphthalene, etc. and in oxygenated solvents, such as alcohols, ketones, esters and ethers. Its melting point (determined as dsecribed above) is 130 to 135° C. and it has a wide softening range, becoming a fluid melt at 214° C. Combustion analysis shows it to contain 2 atoms of hydrogen per carbon atom. On molding the polymer at a temperature of 150° C. and a pressure of 10,000 p.s.i. there is formed a disc whose Shore hardness is 75 to 90.

When the polymer is pressed, at a temperature of 175° C. and a pressure of 5000 p.s.i., to form a film 7 mils in thickness the product is found to have the following properties:

| | | |
|---|---|---|
| Breaking stress | p.s.i. | 4050 |
| Yield strength | p.s.i. | 3137 |
| Tensile strength | p.s.i. | 4050 |
| Elongation | percent | 222 |

*Example II*

The procedure of Example I is repeated except that the lithium aluminum hydride is dissolved first in about 30 times its weight of anhydrous ethyl ether before it is added to the dry xylene, the proportion of the latter being decreased, correspondingly, to 320 parts, and the reaction temperature is 75 to 95° C. The polymer has a melting point of 130° C. and becomes a fluid melt at 200° C.

*Example III*

3.8 parts of lithium aluminum hydride are added, under an atmosphere of nitrogen, to 352 parts of decahydronaphthalene. 13.2 parts of aluminum chloride are then added and the mixture is agitated by means of a high speed stirrer operating at 5000 to 6000 r.p.m. while ethylene at atmospheric pressure is passed into the mixture for 2 hours at the rate of about 7 parts per hour and while the temperature is maintained at 80° C. No insoluble crystalline polyethylene is produced. A solution of 6.6 parts of titanium tetrachloride in 58 parts of decahydronaphthalene is then added and the flow of ethylene is resumed for another two hours while the mixture is maintained at a temperature of 80 to 90° C. The product, after purification as in Example I, is insoluble highly crystalline polyethylene melting rather sharply to a fluid melt at 130° C. This sharp melting point, obtained when using a larger quantity of $AlCl_3$ than in Example I, is in contrast to the wide softening range of the product shown in Example I.

*Example IV*

A solution of 3.8 parts of lithium aluminum hydride in 110 parts of ether is added, while stirring at high speed and under a nitrogen atmosphere, to 352 parts of decahydronaphthalene. Then a solution of 4.4 parts of aluminum chloride in 25 parts of ether and a solution of 4.7 parts of titanium tetrachloride in 40 parts of decahydronaphthalene are added to the mixture and ethylene gas at atmospheric pressure is passed into the mixture at the rate of 7 parts per hour while high-speed stirring is continued and while the temperature of the reaction mixture is maintained at 140° C. After purification as in Example I, the resulting polyethylene melts at a temperature of 130 to 135° C., becomes a fluid melt at a temperature of 210° C., and has properties similar to those of the product of Example I.

*Example V*

Thirty parts of crushed cryolite are mixed with 352 parts of tetrahydronaphthalene. A solution of 3.8 parts of lithium aluminum hydride in 110 parts of ether is added to the cryolite-tetrahydronaphthalene mixture under nitrogen while stirring at 6000 r.p.m., and thereafter a solution of 4.4 parts of aluminum chloride in 30 parts of ether is added to the stirred mixture. Ethylene is then passed into the stirred mixture at a rate of about 7 parts per hour at 28° C. for one hour, after which the temperature is raised to 70° C. and a solution of 4.7 parts of titanium tetrachloride in 40 parts of decahydronaphthalene is added. Passage of ethylene is continued for three more hours with rapid stirring at a temperature of 80 to 88° C.

The resulting reaction mixture is cooled and filtered and the solid material thus obtained is treated first with excess methanol and then with a hot mixture of methanol and concentrated hydrochloric acid. The resulting undissolved material is filtered, dried, and added to 300 parts of tetrahydronaphthalene which is heated to 150° C. with agitation to form a solution. The solution is filtered hot and the insoluble material is again extracted with 300 parts of tetrahydronaphthalene at 150° C. and filtered hot. On cooling the combined filtrates from the latter two hot filtrations to room temperature, a gelatinous polymer separates out. This polymer is filtered and dried to produce a white flaky product melting at 130° C. and becoming a clear melt at 200° C.

It is to be understood that the foregoing detailed description is given merely by way of illustration and that many variations may be made therein without departing from the spirit of my invention.

Having described my invention what I desire to secure by Letters Patent is:

1. Process for the production of polymers, which comprises catalytically polymerizing ethylene in the presence of a catalyst formed by mixing a metal hydride selected from the group consisting of alkali metal hydrides and alkali metal-aluminum hydrides, an aluminum halide and a halide of a metal of group IV$b$, the mole ratio of said halides to said hydride being in the range to produce a normally solid polymer.

2. Process as set forth in claim 1 in which the polymerization reaction is effected under a pressure of at most about 100 atmospheres.

3. Process for the production of polymers, which comprises polymerizing ethylene by intimate contact with a solid catalyst in the presence of a substantially inert solvent for ethylene, said catalyst being formed by mixing a metal hydride selected from the group consisting of alkali metal hydrides and alkali metal-aluminum hydrides, an aluminum halide and a halide of a metal of group IV$b$, the mole ratio of said aluminum halide to said metal hydride being in the range of about 0.1 to about 1.0 and the mole ratio of said halide of group IV$b$ metal to said metal hydride being in the range of about 0.1 to about 1.0.

4. Process as set forth in claim 3 in which the metal hydride is lithium aluminum hydride.

5. Process as set forth in claim 3 in which the aluminum halide is aluminum chloride.

6. Process as set forth in claim 3 in which the halide of a metal of group IV$b$ is titanium tetrachloride.

7. Process as set forth in claim 3 in which the catalyst is supported on a solid carrier.

8. Process as set forth in claim 7 in which the carrier is cryolite.

9. Process for the production of polymers, which comprises polymerizing ethylene by intimate contact with a solid catalyst in the presence of a substantially inert solvent for ethylene, said catalyst being formed by mixing lithium aluminum hydride, aluminum chloride and titanium tetrachloride the mole ratio of said aluminum chloride to said aluminum hydride being in the range of about 0.1 to about 1.0 and the mole ratio of said titanium tetrachloride to said aluminum hydride being in the range of about 0.1 to about 1.0.

10. Process as set forth in claim 9 in which the solvent is a hydrocarbon.

11. Process as set forth in claim 9 in which the catalyst is supported on a solid carrier.

12. Process as set forth in claim 11 in which the carrier is finely divided cryolite.

13. Process as set forth in claim 9 in which the polymerization reaction is effected under a pressure of at most about 100 atmospheres.

14. A polymerization catalyst formed by mixing a metal hydride selected from the group consisting of alkali metal hydrides and alkali metal-aluminum hydrides, an aluminum halide and a halide of a metal of group IV$b$, the mole ratio of said aluminum halide to said metal hydride being in the range of about 0.1 to about 1.0 and the mole ratio of said halide of group IVb metal to said metal hydride being in the range of about 0.1 to about 1.0.

15. A polymerization catalyst formed by mixing a metal hydride selected from the group consisting of alkali metal hydrides and alkali metal-aluminum hydrides, an aluminum halide and a halide of a metal of group IVb, the mole ratio of said aluminum halide to said metal hydride being in the range of about 0.1 to about 1.0 and the mole ratio of said halide of group IVb metal to said metal hydride being in the range of about 0.1 to about 1.0, said catalyst being supported on a solid carrier.

16. A polymerization catalyst formed by mixing lithium aluminum hydride, aluminum chloride and titanium tetrachloride the mole ratio of said aluminum chloride to said aluminum hydride being in the range of about 0.1 to about 1.0 and the mole ratio of said titanium tetrachloride to said aluminum hydride being in the range of about 0.1 to about 1.0.

17. Process for making a polymerization catalyst which comprises mixing a metal hydride, an aluminum halide and a halide of a metal of group IVb the mole ratio of said aluminum chloride to said aluminum hydride being in the range of about 0.1 to about 1.0 and the mole ratio of said titanium tetrachloride to said aluminum hydride being in the range of about 0.1 to about 1.0.

18. Process for making a polymerization catalyst which comprises mixing lithium aluminum hydride, aluminum chloride and titanium tetrachloride the mole ratio of said aluminum chloride to said aluminum hydride being in the range of about 0.1 to about 1.0 and the mole ratio of said titanium tetrachloride to said aluminum hydride being in the range of about 0.1 to about 1.0.

19. In a polymerization process, the steps of contacting ethylene under polymerization reaction conditions including a temperature of at least 20° C. and at least at atmospheric pressure with an inert liquid hydrocarbon reaction medium containing a catalyst consisting essentially of a mixture of an alkali metal hydride, aluminum trichloride and titanium tetrachloride, the mole ratio of said alkali metal hydride to titanium tetrachloride being greater than one and similarly the mole ratio of the alakli metal hydride to aluminum trichloride being also greater than one.

References Cited in the file of this patent
UNITED STATES PATENTS

| 2,699,457 | Ziegler et al. | Jan. 11, 1955 |
| 2,721,189 | Anderson et al. | Oct. 18, 1955 |

FOREIGN PATENTS

| 874,215 | Germany | Apr. 20, 1953 |
| 534,792 | Belgium | Jan. 31, 1955 |
| 538,782 | Belgium | Dec. 6, 1955 |
| 785,314 | Great Britain | Oct. 23, 1957 |